Feb. 3, 1970     S. J. POPEIL     3,493,722
HAIR CURLER STEAMER AND FACIAL SAUNA DEVICE
Filed Jan. 2, 1968     6 Sheets-Sheet 1
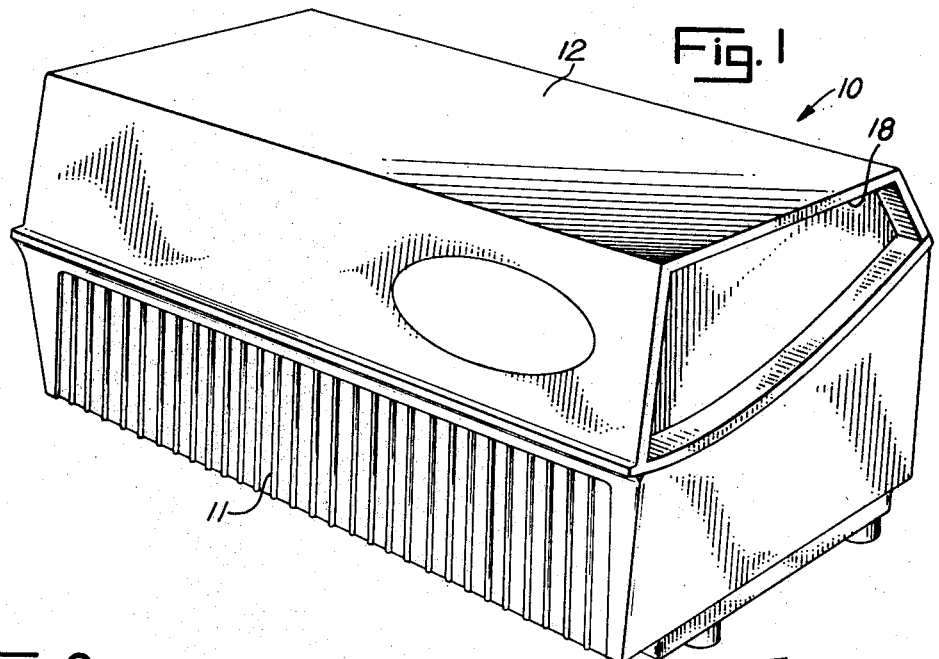
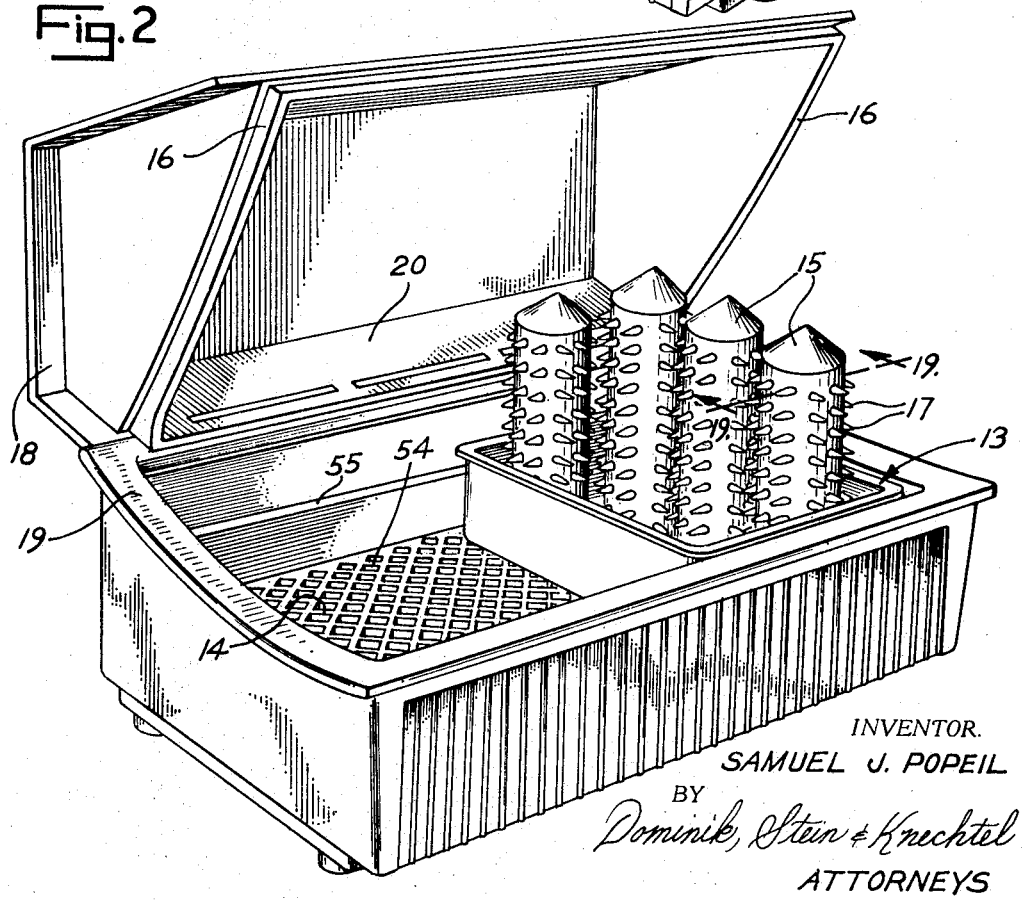
INVENTOR.
SAMUEL J. POPEIL
BY
Dominik, Stein & Knechtel
ATTORNEYS

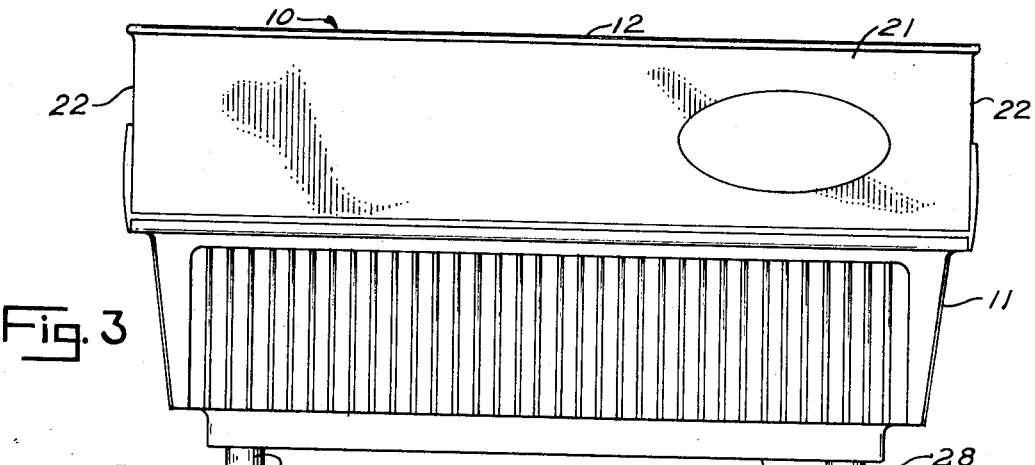
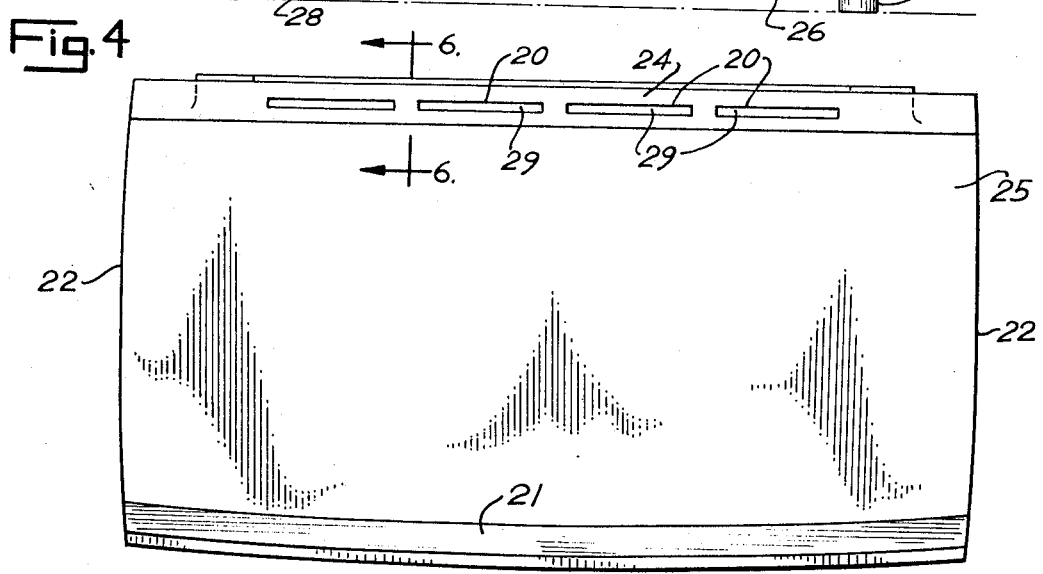
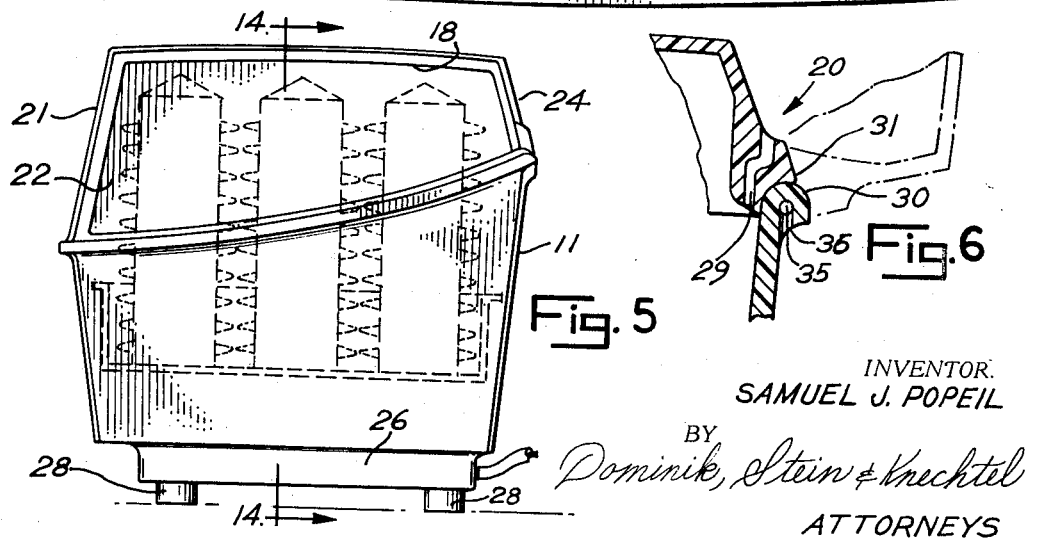
INVENTOR.
SAMUEL J. POPEIL

Feb. 3, 1970
S. J. POPEIL
3,493,722
HAIR CURLER STEAMER AND FACIAL SAUNA DEVICE
Filed Jan. 2, 1968
6 Sheets-Sheet 3
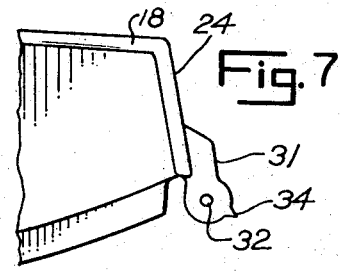
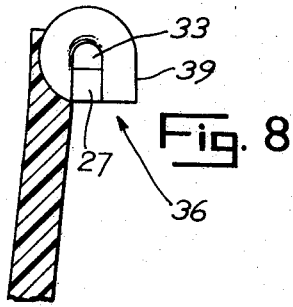
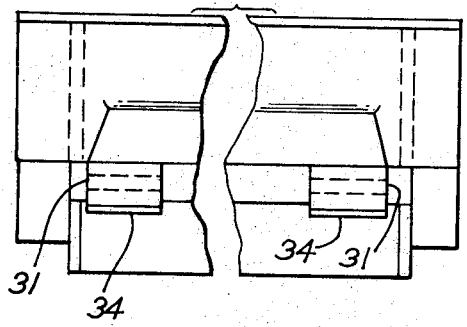
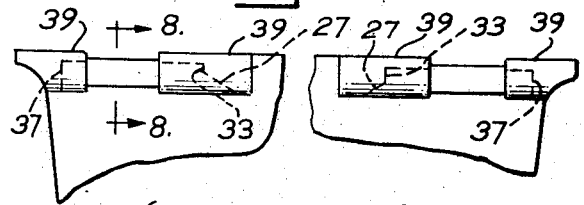
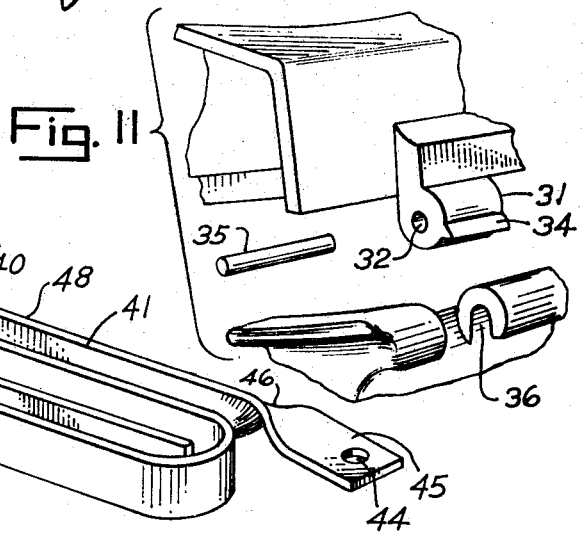
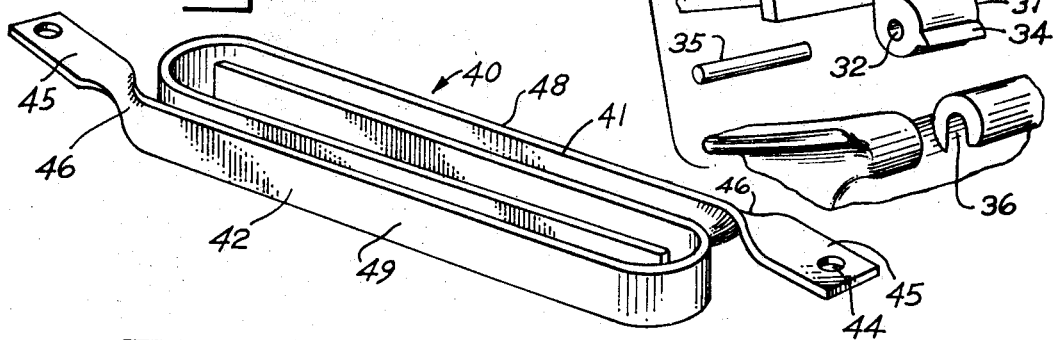
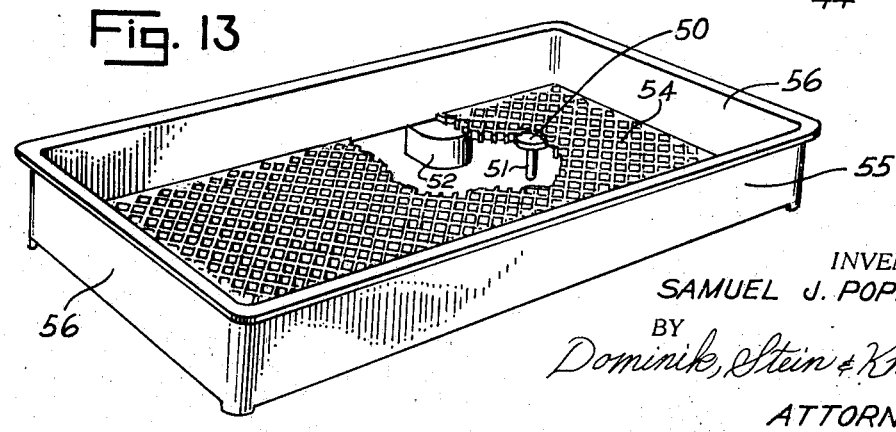
INVENTOR.
SAMUEL J. POPEIL
BY
Dominik, Stein & Knechtel
ATTORNEYS

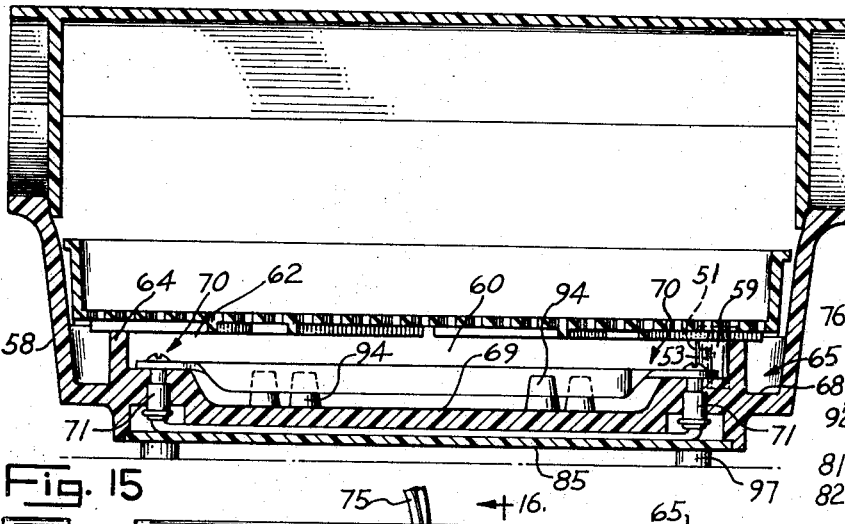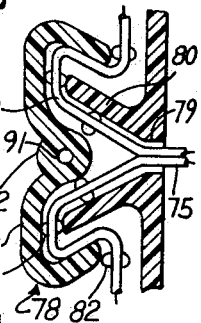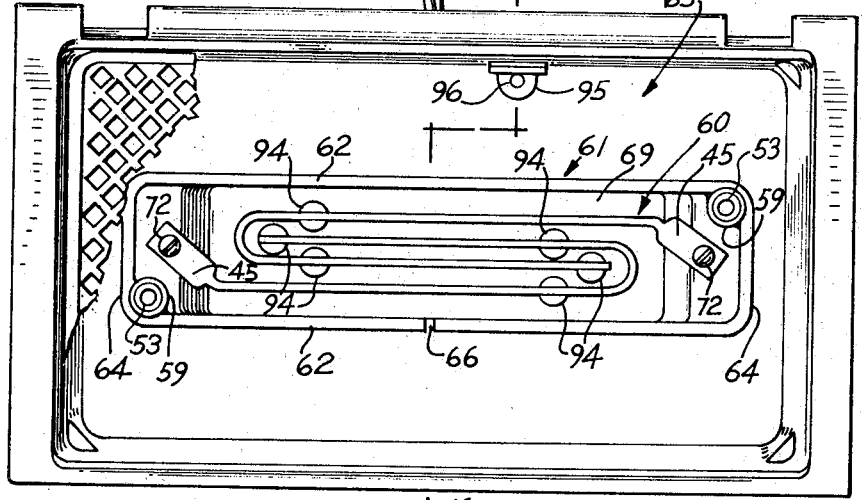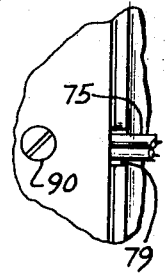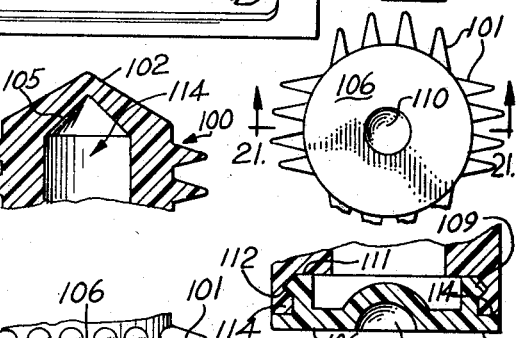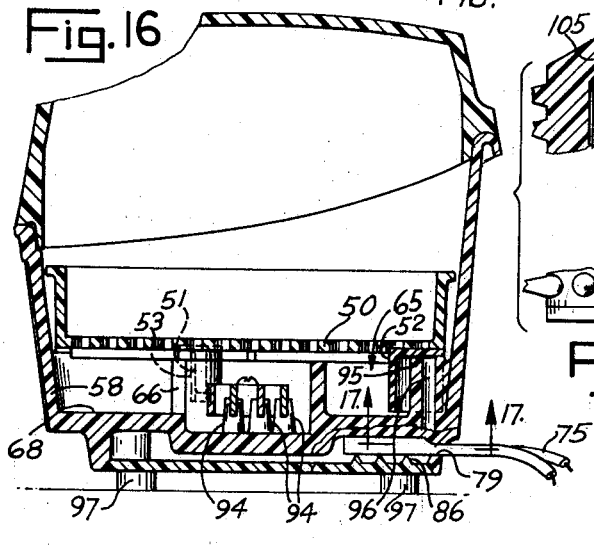

Feb. 3, 1970  S. J. POPEIL  3,493,722
HAIR CURLER STEAMER AND FACIAL SAUNA DEVICE
Filed Jan. 2, 1968  6 Sheets-Sheet 5
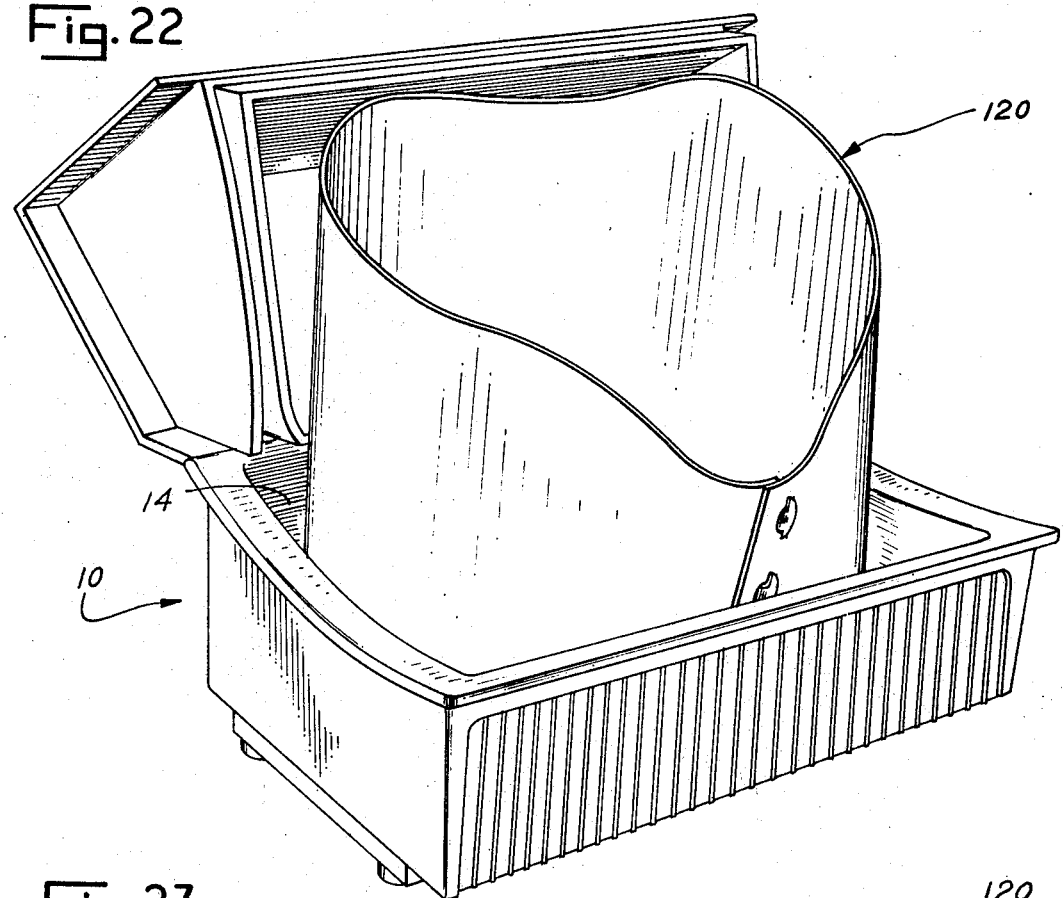
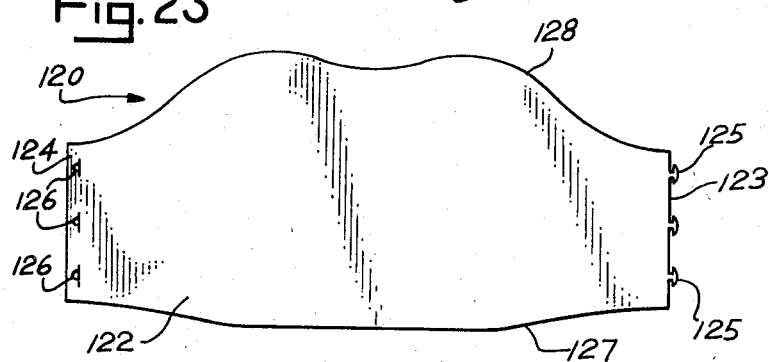
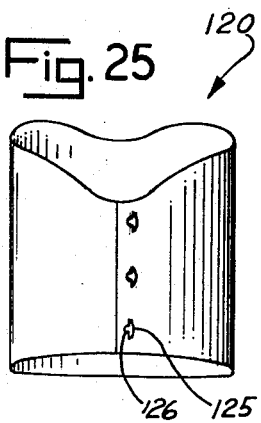
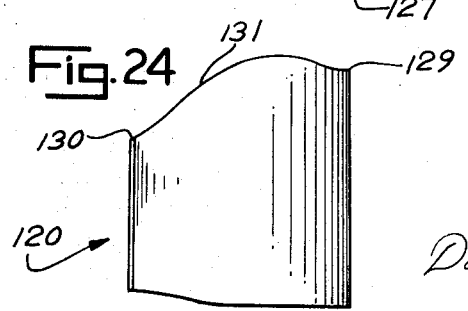
INVENTOR
SAMUEL J. POPEIL
BY
Dominik, Stein & Knechtel
ATTORNEYS

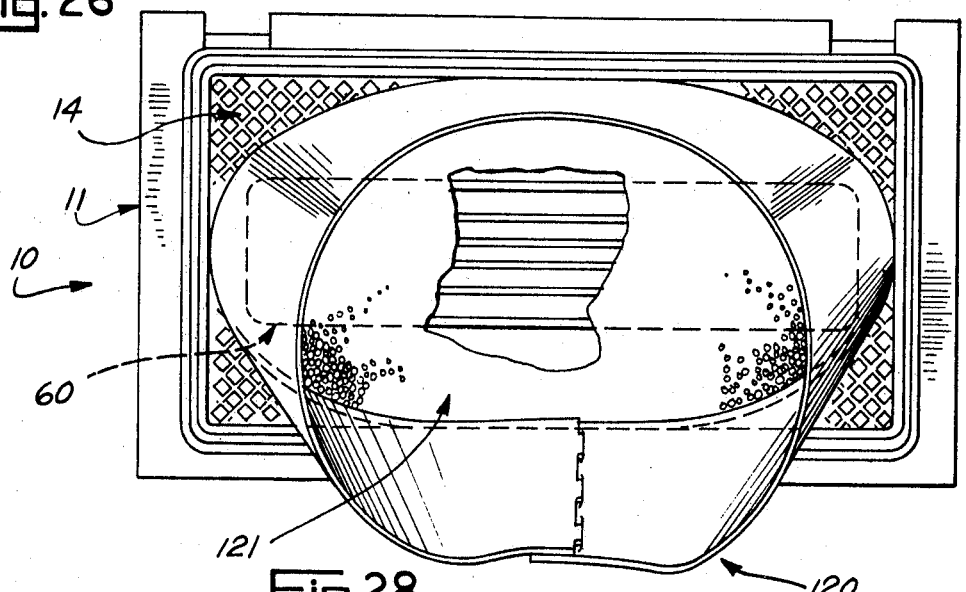
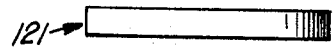
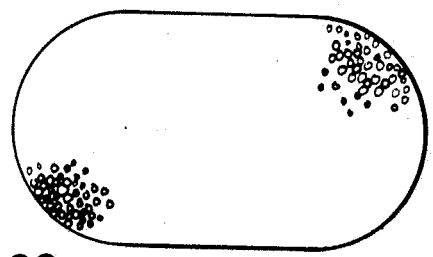
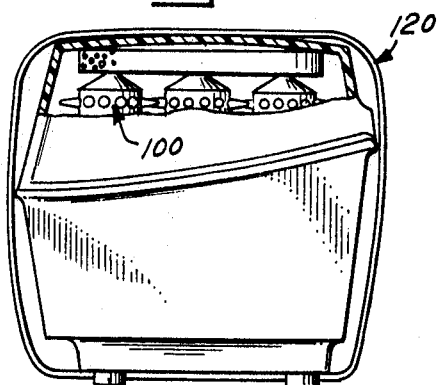
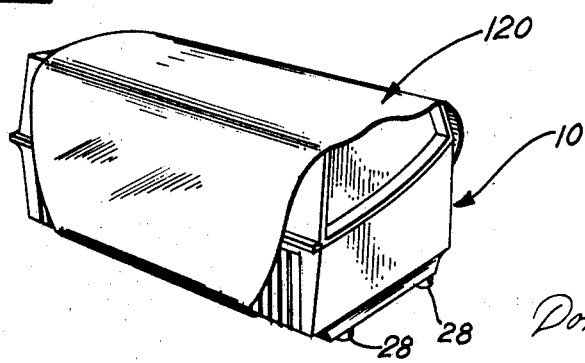

United States Patent Office 3,493,722
Patented Feb. 3, 1970

3,493,722
HAIR CURLER STEAMER AND FACIAL
SAUNA DEVICE
Samuel J. Popeil, Chicago, Ill., assignor to Popeil Brothers,
Inc., Chicago, Ill., a corporation of Delaware
Continuation-in-part of applications Ser. No. 551,320,
May 19, 1966, Ser. No. 591,939, Sept. 6, 1966, and
Ser. No. 616,548, Feb. 16, 1967. This application
Jan. 2, 1968, Ser. No. 695,043
Int. Cl. A45d 4/10; H05b 3/60
U.S. Cl. 219—222                                    27 Claims

ABSTRACT OF THE DISCLOSURE

The disclosure is of a steam chest suitable both for use in steaming a plurality of hair rollers and as a facial sauna. The steam chest has a cover hinged at its rear edge to a base member, and a reservoir and steaming area beneath a perforated support tray. The steam is generated in an area separated from a reservoir portion by means of side wall dams. A pair of parallel electrodes which transmit current between their faces using the water as a conductor serve to generate the steam. A slot is provided in the dam separating the steam area from the reservoir to slowly admit water into the steaming area. The hair rollers are placed on the support tray to steam them for use in setting hair, whether natural or in hair pieces or wigs.

A sauna shield is proportioned to nestingly fit within the steam chest, and snugly fits against the inner upstanding walls of the support tray, and functions as a facial shield channel the steam generated in the steam chest, so that the steam chest can be used as a facial sauna. A permeable pad is provided generally conforming to the cross-section of the sauna shield at its base portion, atop the perforated support tray, since the steam generated can produce scalding blasts. The pad functions both to evenly diffuse the steam and to act as a wick for the addition of medicants or inhalants.

---

This application is a continuation in part of earlier filed application Ser. No. 551,320, filed May 19, 1966 (now abandoned), and subsequent applications Ser. No. 591,939, filed Sept. 6, 1966 (now abandoned), and Ser. No. 616,548 filed Feb. 16, 1967 (now abandoned).

The present invention relates to a steam chest, and more particularly a steam chest especially adapted to be electrically heated for steaming a plurality of rollers to be used in styling hair. Additionally, the same chest may be adapted to serve as a facial sauna or inhaler, in either instance, delivering a safe, uniform bath of mild steam to the face or nostrils.

The discovery that a cylindrical hollow closed roller having a plurality of extending spines can be steamed and effectively employed in quickly setting hair, wigs or a hair piece is set forth in detail in the above patent applications. While various techniques may be used to steam the rollers, and varying apparatus, the present invention relates to a steam chest especially developed for this purpose. Several problems must be overcome in connection with steaming rollers for use in the hair. Most importantly, any apparatus employed must be safe to use, quick and easy to operate, compact for storage and for traveling, and economical to manufacture. Since the method of dressing an average hairdo requires placing anywhere from 12 to 18 rollers in the hair, any acceptable steam chest must necessarily be able to maintain a full complement of 18 rollers fully steamed, bathed and moisture droplets, and readily available for sequential insertion in the hair, or for prompt reheating and moistening after they have been removed from the hair. Thus, a reclosable steam chest must be provided to retain the rollers at maximum heat and moisture saturation, and yet permit quick removal of the individual rollers. In addition, an ideal steam chest must be adaptable to a wide variety of mineral content of available tap water so that extensive preparation for use in water conditioning is not required.

The prior art is amply represented by Patent 3,119,925 in which a pair of parallel electrodes are employed to warm nursing bottles and the like. The problems faced by the prior art are related to timing the heating of the nursing bottles, the hard boiling eggs, and the like. In each instance a principal object of the device is to shut off at a certain point in time after a given amount of heat is transferred. When steaming hair rollers, however, it is preferred to bring the rollers up to usable heat as quickly as possible, and then maintain the rollers at usable heat and moisture saturation density for as long as possible. Furthermore, a measured amount of water, preferably 6 to 8 ounces, should be sufficient for setting the hair. Also, because a steam chest is used to set the hair rather than cook eggs or warm baby bottles, it is more likely to find itself employed in a dressing room, bedroom, or bathroom, where the release of excessive amounts of steam and the generation of an excessive amount of heat is undesirable.

In view of the foregoing, it is one of the principal objects of the present invention to provide a steam chest especially adapted for steaming rollers for use in quick setting the hair which is safe, efficient, and economical to use, and will not damage the hair by the application solely of dry heat.

A further important object of the invention is to provide a steam chest which will utilize approximately 6 to 8 ounces of water, and retain the contents of rollers up to 18 in number, bathed in an environment of steam for a period of time sufficient to employ all of the rollers to set the hair while accommodating a wide variety of mineral content available tap waters.

A more detailed object of the invention looks to the provision of such a steam chest which renders it difficult for the user, in opening the same by hand, to receive an undue exposure to the retained steam generated in the chest while removing the rollers from the interior, or replacing rollers into the chest for subsequent heating.

A more detailed object of the invention is to provide a special reservoir within the steam chest which promotes reclamation of the contained water within the chest and reduces current leakage and possible shock exposure to the user.

Still another object of the invention is to provide a unique hinge construction between the top member and base of the steam chest which contains no metal parts thereby avoiding contamination by rust and metallic deterioration, eliminating the shock risk of metallic parts, and further reducing the cost of manufacture and assembly of the steam chest.

Still another object of the present invention is to provide a steam chest heated by ordinary household electricity with a safe strain relieving cord attachment to the base body.

Apart from achieving the foregoing objectives, the subject steam chest can also serve as a hot vapor inhaler. For persons suffering with sinus problems, or minor respiratory ailments, inhaling pure steam can give noticeable relief. Where special medication is indicated, a few drops of concentrated inhalant on the permeable pad are uniformly dispersed by the steam for inhaling in the same manner as pure steam. In much the same manner as used as an inhaler, the subject steam chest can be employed to give a safe facial sauna treatment, and less expensively than saunas sold exclusively for the one purpose. In addition, as a pre-shave treatment, a man can soften his beard before shaving with a two minute steaming which produces a professional-like softening of the beard comparable to a barber's hot towel.

As will be defined in greater detail hereinafter with reference to the accompanying drawings and a description of a preferred embodiment of the invention, the steam chest contemplates a base unit and a hinged cover. The cover having lateral wings for grasping and opening, is hinged by means of non-metallic, corrosion resistant, non-conductive flexible pins to the base. The base member, in turn, is adapted to receive approximately 6 to 8 ounces of water distributed between a peripheral recirculating water reservoir portion, and a center steam generating activator to approximately one-third of the area, the peripheral reservoir serving to condense, reclaim, and recirculate the moisture. Offset U-shaped vertically oriented opposed electrodes are employed to define three boiling zones in the steam well for the two-fold purpose of delivering a fast start of the steaming action and facilitating easy cleaning. Positively oriented locaters position the U-shaped electrodes thereby insuring safe separation and arc elimination. Additionally a perforated roller tray permanently secured to the base prevents fingers from contacting the electrodes. The vertical orientation of the electrodes permits the steaming action to minimize mineral buildup on the opposed electrode faces Relief vents are provided across the upper rear edge of the cover to permit sufficient steam to escape thereby avoiding pressuring the interior leakage around the marginal edges where the cover interfits with the base portion, and further directing the steam escape in a uniform curtain which dissipates quickly and reduces the possibility of the user being burned by steam buildup. An additional safety feature is an overflow drain preventing overfilling of the steam well.

Two of the principal risks to safe usage of any steam generating device employing opposed electrodes are the risk of the unit catching fire, and a risk of current leakage or direct shorting which can shock the user. In the steam chest illustrative of the present invention a flame retardent polypropylene cover member is employed as well as a flame retardent tray for supporting the rollers. In addition, the base member is so proportioned that it can be made of flame retardent phenolic. A flame retardent wiring base plate cover is also employed. In addition, the very structure of the unit containing a central steam generating well which holds only approximately one-third of the total amount of moisture localizes the heat to a central portion of the unit, and the condensing water which recirculates off the walls into the peripheral reservoir serves to cool the periphery of the unit. It will also be noted in the detailed description which follows that the wire cords which enter the unit from underneath are positioned primarily beneath the reservoir portion and thereby being maintained in a cool condition.

A perforated support tray is adapted for insertion into the steam chest, in a supported spaced position above the heating elements. The hair rollers are supported upon the tray, while being steamed. The tray is all plastic having no exposed metal parts, and permanently covers the steam well. In addition, when traveling with the unit, the rollers are confined between the cover and tray within the chest thereby making the entire unit readily portable as a traveling kit.

Current leakage and risk of shock are primarily retarded by securing the perforated support tray into the steam chest by molding anchor pins in the bottom of the tray. Metal tinnerman inserts are employed to receive the anchor pins, but of necessity positioning the anchor pins will completely fill and cover the tinnerman inserts. The perforations or holes in the supporting tray are small, and will not pass bobby pins, fingers, and the like. Additionally, to reduce the possibility of shock, the unit is built with a 100% over-capacity. In short, six ounces is the recommended amount of water to be poured into the unit, and a cup is preferably provided to deliver this amount of water, but actually, even with twelve ounces of water, a 100% overcharge, the water does not come above the perforations in the tray. Additionally a safety drain is provided to discharge any excess water when more than ten ounces are in the excess steam well. Thus, not only is there a 100% capacity safety factor, but a safety drain to preclude overfilling. With the opposed plate electrode devices of the prior art their principal function is often timing, and accordingly, when they are over-filled they are not being used for the primary intended use such as egg cooking, and hence the possibility of moisture contacting the hand of the user and shock ensuing are greatly enhanced. The very converse is the case with the steam chest illustrative of the present device, for as will appear herein after, using the same as a facial sauna or an inhalant for a period of half an hour would undoubtedly pass the tolerable level of exposure of the average user.

A sauna shield member which is generally flexible is proportioned to nestingly fit within the steam chest, atop the perforated support tray. The sauna shield functions as a facial shield for channeling the steam generated in the steam chest, so that the steam chest can be used as a facial sauna. The sauna shield further is adapted to fit about the exterior of the steam chest, thereby securing the same for traveling with the pad nested below the steam chest, and the rollers locked inside. As an added advantage the shield will serve as a cover for packing the chest within a suitcase, or vanity case. The latter feature also is a convenient way to store the tubular member, when the steam chest is not in use.

A permeable pad diffuser preferably of polyurethane which generally conforms to the cross-section of the tubular member at its base portion is provided. The pad seats in its dry state within the tubular member leaving an annular marginal gap to provide for swelling. The perforated support tray orifices combine with the cellular urethane structure to both diffuse the steam generated in the steam chest and to act as a wick for the addition of medicants or inhalants.

The permeable pad also is adapted to be placed within the steam chest atop the rollers. When positioned in this fashion, and the top cover of the steam chest is closed, the rollers are resiliently supported and retained so as to protect them from damage while the steam chest is being transported.

Further objects and advantages of the present invention will become apparent as the following description of an illustrative embodiment takes place, taken in conjunction with the accompanying drawings in which:

FIG. 1 is a perspective front view of an illustrative steam chest in its closed position.

FIG. 2 is a perspective view of the steam chest of FIG. 1 with the lid open illustrating how the rollers are positioned interiorly of the chest.

FIG. 3 is a front elevation of the steam chest showing the support feet for the same.

FIG. 4 is a top view of the steam chest illustrating the steam vent ports at the rear of the lid.

FIG. 5 is an end view in like scale to FIGS. 3 and 4 illustrating the proportions of the steam chest in a location of the electric inlet.

FIG. 6 is a transverse sectional view showing the steam vent passageway and a portion of the hinge joint, illustrating in phantom lines the open position of the cover, the same being taken along section line 6—6 of FIG. 4.

FIG. 7 is an enlarged broken end view of the rear edge of the cover illustrating the relationship between the hinge lug and the rear portion of the cover.

FIG. 8 is an enlarged broken section of the hinge portion of the base of the steam chest taken along section line 8—8 of FIG. 10.

FIG. 9 is a rear view partially broken of the steam chest cover illustrating the position in relationship of the hinge lugs and steam vents.

FIG. 10 is a partially broken view of the rear of the base member illustrating the positioning of the hinge pin channels.

FIG. 11 is an enlarged broken partially exploded view showing the relationship between the hinge pin, the hinge lug of the cover, and the hinge pin channel portion of the base.

FIG. 12 is an enlarged perspective view of the two electrodes showing their disassembled relationship.

FIG. 13 is a perspective view of the roller tray.

FIG. 14 is a longitudinal sectional view of the assembled steam chest taken along section line 14—14 of FIG. 5.

FIG. 15 is a top view, partially broken, of the steam chest base showing the heating electrodes and their relationship to the steam well and water reservoir.

FIG. 16 is a transverse sectional view in similar scale to FIGS. 14 and 15 taken along section line 16—16 on FIGS. 14 and 15.

FIG. 17 is a horizontal section taken from beneath the reservoir portion of the steam chest shown in FIG. 16, at section line 17—17, but in enlarged scale, illustrating the labyrinth lead wire lock structure employed.

FIG. 18 is a broken view taken from immediately beneath the section illustrated in FIG. 17 showing how the false base is mounted atop the labyrinth lead lock to secure the wire safely in place.

FIG. 19 is a broken, partially sectioned, front elevation of the rollers shown in FIG. 2 taken along section line 19—19 of FIG. 2.

FIG. 20 is a bottom view of the roller shown in FIG. 19.

FIG. 21 is a transverse sectional view of the bottom of the roller taken along section line 21—21 of FIG. 20.

FIG. 22 is a perspective view of the steam chest, illustrating the manner in which the facial shield is inserted within it, for the purpose of using the steam chest as a facial suana.

FIG. 23 is a plan view of the blank from which the facial shield is formed.

FIG. 24 is a side plan view of the facial shield when assembled.

FIG. 25 is a rear plan view of the facial shield when assembled.

FIG. 26 is a top plan view of the steam chest, partially broken away, illustrating the placement of the facial shield and the permeable pad therein.

FIG. 27 is a top plan view of the permeable pad.

FIG. 28 is an end plan view of the pad of FIG. 27.

FIG. 29 is a side plan view of the pad of FIG. 27.

FIG. 30 is a perspective view generally illustrating the manner in which the steam chest is slideably inserted within the facial shield.

FIG. 31 is a sectional view taken transversely through the steam chest illustrating the manner in which the permeable pad functions to protectively support the rollers for transportation, and further illustrating the manner in which the facial shield receives the steam chest therein for transporting it.

The structure and features of the illustrative steam chest 10 will be best understood by reference to FIGS. 1 and 2 and a brief description of the usage of the device. The cup 13 is filled with water to its 6 ounce capacity and then poured into the base 11 atop the perforated roller tray 14. The user then plugs the cord (not shown in FIGS. 1 and 2) into an ordinary wall outlet, and then opens the cover 12. The rollers 15 are normally stored inside the base 11 atop the perforated roller tray 14. The electrodes will immediately begin to generate steam. The user then grasps the finger grip 18 of the cover 12, and lowers the cover so that the sealing flange 16 of the cover fits snugly within the base top rim 19. Within approximately 10 minutes sufficient steam will be generated to coat the rollers 15 with moisture, and heat them to a temperature approximating 180–190° F. Any excess steam generated will escape to the atmosphere through the vent assembly 20 in the rear portion of the cover 12. This venting prevents the cover from chattering or otherwise giving up its contained steam around the sealing flange 16.

After eight to ten minutes have passed, the user may grasp the cover by the finger grip 18 on either the right or left side, making the steam chest equally handy for a left-handed or right-handed user. By forcing the user to grasp the finger grip 18 at the end of the cover, the hand is naturally out of the way of steam which may escape from inside the base and cover when the same are opened to the position shown in FIG. 2. The rollers 15 are then grasped by the spines 17 which are relatively cool to the touch, and positioned in the hair. Immediately after each roller 15 is removed for placing in the hair, the cover is again closed so that the generating steam will maintain the temperature of the remaining rollers, and moisten their periphery. In addition, at any time a roller is removed from the hair, it may be replaced in the steam chest 10 for additional heating.

The cover and base construction are more fully set forth in their proportions and orientation in FIGS. 3, 4, and 5 of the drawings. It will be noted that the cover has a front face 21 and is closed by a pair of cover ends 22, the finger grips 18 being above the cover ends 22. The cover rear portion 24 includes the vent ports 29 of the vent assembly 20, and also the hinge lug 31 of the hinge assembly 30. The cover top 25 is imperforate and slightly curved as indicated in the end view shown in FIG. 5. The cover is molded of a flame retardant polypropylene with an etched mold to simulate a leatherette finish. The base 11 includes a base bottom 26. The supporting feet 28 are secured to a false base 85 (to be described hereinafter).

Referring now to FIGS. 7 and 11, it will be seen that the hinge lug 31 depends from the rear of the cover and two are oriented in spaced relation adjacent the end of the cover. Each such lug has a hinge lug pin hole 32 proportioned to receive the hinge pin 35, and a hinge stop 34 which depends from the rear portion of the hinge lug 31. The mating relationship between the hinge lug 31 and the pin channel 36 is illustrated in FIG. 11. There it will be seen that the pin channel 36 is a downwardly opening slot in the hinge pin channel runner 39 terminating at its end portion in a hinge pin stop 37 (see FIG. 10). At the opposite face, a corresponding channel 36 terminates in an abbreviated stop 33 which is followed by a chamfered face 27.

In assembling the cover to the base, the cover is positioned so that the hinge lug pin hole 32 is opposite the pin channel 36. The pin 32 is then inserted along the chamfered face 27. The pin being molded of a nylon or polypropylene flexible material, curves and enters into the hinge lug pin hole 32 and abuts the hinge pin stop 37. The hinge pin is cut slightly shorter than the distance between the hinge pin stop 37 and the abbreviated stop 33, and then straightens out and snaps into position in shiftable abutting relationship between the abbreviated stop 33 and hinge pin stop 37.

It will become apparent particularly from FIG. 8 that the forming of the pin channel 36 within the hinge pin channel runner 39 requires no side coring for plastic molding. Furthermore, no corrosive metal parts are employed, and therefore rust at the joint is no problem when subjected to the constant steam leakage attendant the use of the steam chest. Also the elimination of a metallic hinge eliminates all exposed conductive parts from above the water level. The assembly is inexpensive and positive. The position of the hinge stop 34 is such that when the cover is opened to the configuration disclosed in FIG. 2, the stop abuts the rear wall of the base 11 and the cover remains in the open position.

The assembled relationship of the cover 12 and the base 11 in combination with the hinge assembly 30 and the vent assembly 20 contemplate a steam generating element in the interior of the steam chest 10. As illustrated in FIG. 12 in an exploded view, the heater assembly 40 contemplates a pair of U-shaped electrodes 41, 42 which are interdigited, that is, one leg of each electrode is disposed between the legs of the other electrode. Each electrode terminates in the mounting aperture 44 in a flat mounting portion 45. A twist 46 connects the mounting portion 45 to the U-shaped electrode bodies 48, 49. As illustrated in FIG. 14, the electrodes are proportioned in such a fashion that the mounting portion 45 of each is in a level plane, the offset parallel relationship between the electrode bodies 48, 49 being determined by the length of the offset legs 46.

As pointed out above, the electrode heater assembly is mounted in a steam well 60 in the base 11, a roller tray 14 being secured above the heater assembly 40. The roller tray 14 is illustrated in FIG. 13 where it will be seen that it has a perforated base 54 flanked by a pair of parallel side walls 55, and a pair of parallel end walls 56. The perforated base may vary in types of perforation, it being essential, however, that steam be permitted to pass through the perforations in the base, and yet the perforations not be so widely spread that the rollers 15 are not securely positionable on the perforated base 54. Perforations not exceeding ⅛" are desirable, and prevent pins from dropping beneath the tray. In this manner, the perforations further serve to disperse the steam when the chest is used for a facial sauna, as described below. Mounting portions 50 with anchor pins 51 are formed at each end of the perforated base 54. When the tray 14 is assembled to the base, the anchor pins permanently engage tinnerman inserts 53 in the tray mounting bosses 59 and thereafter the tray cannot be removed which could expose bare electrodes. A splash shield 52 is molded into the tray above the base drain hole as will be described hereinafter.

Turning now to FIGS. 14 through 16, it will be seen that the steam well 60 is defined by a rectangular dam 61. The dam, in turn, is defined by parallel longitudinal dam sides 62, and the dam ends 64. A water reservoir portion 65 surrounds the dam 61, the area of the dam approximating one-third of the total area available for holding the water employed to generate the steam. Water is permitted to flow from the reservoir 65 into the steam well 60 through the relatively narrow inlet slot 66. It is preferable that the slot in the wall approximate .100" to permit the water to readily run through without being blocked by surface tension. A slot gap of .060", for example, will greatly impede the circulation of the water in the reservoir into the steam well 60. In addition, it is preferable that all of the edges surrounding the slot be radiused to a point of tangency at the respective faces.

When a normal six ounce charge of water is used in the steam chest 10, approximately one-third of the entire quantity of water will be in the steam well 60. As the current passes between the electrodes 41, 42 of the heater assembly 40, that portion of the water which is within the steam well 60 is heated quickly, and begins to boil and dissipate throughout the steam chest 10 as steam. As the steam contacts the rollers 15, and the walls of the cover 12 it will condense in part, and a portion of the water will drain back into the reservoir 65, and be regenerated as steam. A portion of the steam, of course, will escape through the vent ports 29, but primarily the cycle is one of regeneration.

As best shown in FIG. 14, the heater assembly electrical connection 70 is in the form of a water-tight bushing 71 containing a wire coupler and a threaded blind hole. The electrode mounting portion 45 fits atop a complementary flat surface in the steam well base 69. The electrodes are then secured by means of a threaded screw 72 engaging the blind hole. The electrodes preferably employ a highly corrosion-resistance stainless steel #302, in contrast to the #430 type stainless which is more corrosive and generally used in the prior art devices. Preferably the electrodes are .040" thick, and spaced at a minimum consistent gap of .230". In many of the prior art devices the spacing of the horizontal plates approximates .100". Because the plates are so close in the prior art units, a build-up of corrosive material takes considerably less time to permit tracking or even arcing across the plates. Furthermore, as will be pointed out hereinafter, electrode locaters 94 are provided to rigidly maintain the fixed gap between the electrodes (see FIG. 15). Because of the vertical orientation of the electrodes a steam iron cleaner or white vinegar overnight soaking followed by a cold water flushing will wash away scale and contamination. Thus, in addition to the self-cleaning action resulting from the vertical orientation of the electrodes and reduced mineral deposits, when cleaning is necessary, it can be quickly and safely completed. In the prior art devices with horizontal plates, such cleaning is rendered unusually difficult because of the inherent recessed mounting of the opposed plates. Furthermore, with the present device virtually all of the water in the steam reservoir is evaporated in usage, and the electrodes do not stand in residual water which of course has a higher percentage of contaminants. The converse is the case with the prior art devices which have closely spaced electrodes which are horizontally oriented.

The power cord 75 is led into the area defined by the bottom of the steam well base 69 and the top of the false base 85 through an inlet port 79. As shown in FIG. 17, the power cord 75 is split into its two separate electrode leads 76 which are secured against dislodgement by means of the labyrinth lead lock 78. The labyrinth lead lock 78 is defined by the Y-shaped wall portion 80, and a peripheral W-shaped wall portion 81. The pathway of the electrode leads 76 is that of a reverse bend terminating in two sharp corners which results in a self-locking attachment when an attempt is made to pull the power cord 75 through the inlet port 79. By employing the labyrinth lead lock 78, the necessity for tying an underwriter's or strain relief knot is eliminated. The wires may be preformed for quick assembly into the labyrinth-like pathway, and greater security and safety in operation is achieved. Furthermore, it will be noted that the labyrinth lead lock is positioned directly beneath the reservoir 75 where the water is considerably cooler than the steam well 69. This location insures the electrode leads 76 and power cord 75 in a position of relatively low temperature, and hence further security against insulation damage attributable to heat. The convoluted channel is additionally defined by the false base 85. The leads 76 are further secured in the labyrinth lock by offset base lugs 82 and false base lugs 86. A locking screw 90 is secured in the lock screw threaded hole 91 in the lock screw boss 92. By leading the power cord 75 through the small inlet port 79, the false base 85 is completely uncluttered and effectively secures the wiring area from contact by the user. Small rubber feet 97 are preferably screwed to the base by means of a screw in the center open portion of each of the rubber feet. Preferably the rubber feet are a non-marking material, and the central hole not only serves to recess the mounting screw, but provides additional friction to prevent slipping, and the consequent possibility of spilling or otherwise dispersing the water in the course of use.

To further insure safety and efficiency in operation, as shown in FIG. 14, electrode locaters 94 are molded integrally in the steam well base 69. It will be observed, particularly from FIG. 15, that the electrode locaters 94 are positioned at the terminal end of each of the U-shaped bodies 48, 49. This provides a positive support for the body at its end portion, and in addition, two further electrode positioners are oriented near the base of the U-shaped electrode legs 48, 49 which, together with the screw attachment of the mounting portion 45 positively and firmly fix the electrodes within the steam well 60. It will be noted that three separate opposed plate areas are defined in which the current passes between the electrodes, and because of the resistance of the water on the steam chamber, the steam is rapidly generated in the three areas.

To further insure safety in operation, as will be noted in FIGS. 15 and 16, a drain boss 95 is provided adjacent the rear wall of the steam chest having a drain hole 96 in open communication with the bottom of the unit terminating in a chamfer at the top of the drain boss 95. The height of the drain boss 95 is calculated to permit filling to 10 ounces which is two-thirds more than the recommended six ounces, and yet less than the safe 12 ounces which will not bring water above the perforated tray 14. As will be particularly noted in FIG. 15, the drain boss 96 is preferably located off center to the right looking downwardly from the mid-point of the steam chest, thereby insuring that any water or steam exiting through the drain hole 95 will not be directed to the wires 75, and yet be in sufficiently a mid-position so that tipping in one direction or the other will still result in a safety overflow. In addition, by locating the drain hole underneath the vents in the cover, the circulation of steam is upwardly and no observable steam discharge occurs through the drain hole in normal operation. Additionally, when filling by pouring the six ounce charge of water on top of the perforated tray, the splash shield 52 shown in FIG. 13 is directly on top of the drain hole 96, and therefore prevents inadvertent splashing of water from running immediately out of the drain hole and wetting the surface atop which the steam chest is being used.

One of the additional distinct advantages of the steam well and peripheral reservoir is that the maximum of current leakage would occur in the steam well, whereas a lesser amount of leakage takes place in the reservoir. Actual tests indicate only 1½ to 2 miliamps of current leakage takes place in the steam well. In the event the unit is tipped, and a portion of the water comes above the perforated tray, and the user comes in contact with the water and a ground source, the amount of current absorbed by the body would be substantially less than if the steam well were not present. Accordingly, the steam well in addition to promoting faster steaming and longer utilization of the water, is an unusual safety feature.

As shown in FIGS. 19 through 21, a modified and improved roller 100 is disclosed which has a self-contained measuring detent 110 which, when filled with baking soda, provides the proper amount of ionization and conductivity for a 6 ounce charge of water, even when the water is distilled. In certain areas, by experiment, the user will determine that ordinary tap water has sufficient conductivity to generate steam quickly and efficiently. In areas where the water is extremely hard, by using distilled water and adding one measuring detent full of baking soda, cleanliness and uniformity of operation can easily be achieved. The care and treatment of the subject steam chest is little different than that of a steam iron with which most housewives are familiar. At least one roller in a set desirably utilizes the measuring detent, although other important structural features of the roller will become apparent in its details.

It will be observed that 12 rows of spines 101 extend from the body of the roller, each row having ten spines. The conical top of the roller has a sharp central point, which eliminates a flat where hot water can accumulate, and terminates in a cornered intersection with the cylindrical roller body for a snap fit. A central core 104 is provided to reduce the weight of the roller, and terminates in a conical core end 105 as illustrated in FIG. 19.

A snap-in base cap 106 is provided which can be press-fitted into the roller body. As shown in FIG. 21, the base cap 106 has a circumferential flange 108 which is proportioned to mate with the flange shoulder 114 at the bottom of the roller body. An annular ring extends from the body of the base cap 106 and terminates in a base cap snap ring 109 which is proportioned to snap-fittingly engage the core end undercut 112. A further annular core shoulder 111 is defined by the end of the core cutout portion to snap-fittingly engage the base cap 106. The snap ring is proportioned to be generally complementary with the core end undercut, the latter being formed at the time of molding, with the mold end pulled out of the core after the material has cooled sufficiently to permit the snap-acting withdrawal.

In operation the improved roller 100 has been found to resist the leakage of water, even if boiled rather than placed in the steam chest. While used in the steam chest, however, because the base cap 106 is at the bottom of the roller 100, and naturally rests atop the roller tray 14, the possibility of water becoming entrapped interiorly is further reduced. Alternative and commercial roller structures are disclosed and claimed in the above-mentioned copending applications, as well as other continuation-in-part applications thereof.

In summary, the steam chest disclosed, because it has a separate steam generating reservoir, can be made with a smaller base and cover portion rendering the unit sufficiently compact for traveling. Even at the reduced size, which also reduces the potential of warpage, a total of 18 rollers can be accommodated.

A metered flow of cooler water is provided by the slot in the dam which defines the steam well, which permits a six ounce cup of water to last approximately one-half hour. Without the central reservoir, the water dissipates in approximately fifteen minutes, and the entire steam chest overheats. Experience has indicated that when styling the hair using the steam chest, that the steam saturation should be maintained for twenty to twenty-five minutes. Thus, by providing the cool reservoir and steam well construction, this time limitation is achieved. Furthermore, the exterior reservoir keeps the outer walls of the unit well below the boiling temperature thereby reducing warpage.

With normal soft water, boiling begins in approximately two minutes with acceleration to a rolling boil by three minutes. Within ten minutes all of the rollers are thoroughly heated and ready for use, but even at that time the water in the peripheral reservoir is only warm to the touch. The perforations in the roller tray disperse the steam in all the curlers and also insure dispersion when used as a facial sauna. The vent in the rear portion of the cover relieves the pressure which would otherwise cause the cover to chatter on the base.

The hinge pin construction permits the use of one hundred percent plastic which eliminates the use of metal parts which would have to be plated and which are more expensive. The nylon or polypropylene pin is inserted in a way that side coring may be eliminated in the base and thus substantially reduce the mold cost and molding items. In addition to being rustproof, there is no necessity to peen over the end of the pin and hold it in place with the hinge. The hinge pin is readily replaceable in the event of damage and the lubricity of the polypropylene makes the hinge work quite easily.

The hand grips on the side of the cover prevent opening from the front, and insure the positioning of the hand of the user at a point where steam will not readily pass when the cover is open. Furthermore, the steam flow within the unit is toward the rear wall of the cover and out of the steam vents, and thus minimizing steam pressure build-up. The steam vents further augment the safety characteristics of the steam chest since the steam escapes in a long curtain along the rear wall of the cover and does not come out in a jet which is the case with a single port.

With an actual test using Chicago tap water, a six ounce filling with the cover closed permitted the generation of steam for 20 minutes with a full complement of eighteen rollers. Without rollers in the steam chest, the water is dissipated in approximately twenty minutes. The average current consumption was two amps at 110 volts. With the cover open, however, the water all evaporated within 15 minutes. With the dam and steam well eliminated, however, a six ounce charge of water will dissipate as quickly as 10 minutes.

Because the charge of water is desirably six ounces, a cup 13 of that capacity is provided as shown in FIGS. 2 and 5. The cup 13 is rectangular and proportioned to hold six of the rollers 15. Thus, the cup can at all times be stored with the unit as a remainder that its filling insures operating the steam chest at only half of its safe capacity.

Referring now to FIG. 22, a facial shield 120 is shown positioned within the steam chest 10, atop the tray 14, to adapt the steam chest for use as a facial sauna. A permeable pad 121 (FIG. 27) is positioned within the shield 120, atop the tray 14, to further diffuse the steam which passes through the perforations of the tray 14. The pad 121 also acts as a wick for medicants or inhalants.

The facial shield 120, as can be best seen in FIGS. 23 to 25, is cut from a single blank of sheet material 122. The material should be flexible, but yet sufficiently rigid to retain its shape when positioned within the steam chest, and particularly when subjected to the heat generated by the steam chest. A material found satisfactory for this purpose is a tenite polyallomer, manufactured by the Tennessee Eastman Company, in flat sheet form 0.03 inch thick.

The opposite end edges 123 and 124 of the facial shield 120 are straight edges and the edge 123 has a number of locking tabs 125 formed in spaced relation along its length. These locking tabs 125 lockingly engage within locking slots 126 formed adajacent the edge 124 to form the facial shield 120, as illustrated in FIG. 25. The facial shield also may be formed by adhesively affixing or sewing these edges 123 and 124 together if desired.

The lower edge 129 of the facial shield blank 122 is contoured to curve upwardly from the center portion thereof toward its outer edges 123 and 124, as can be best seen in FIGS. 23 and 24, so that the facial shield 120 tilts forward toward the user when it is assembled and placed within the steam chest 10. Its upper edge 128 also is contoured so that the rear edge 129 (FIG. 24) of the facial shield, when assembled, is higher than its front edge 130 and its side edges 131 flow gradually downward from the rear to the front. The contour is such that the user can easily adapt the facial shield 120 to the shape of his face.

When assembled, the facial shield 120 is tubular and is caused to assume a generally elliptical cross-section when it is placed within the steam chest 10, atop the tray 14, as shown in FIG. 26. It may be noted that while the facial shield 120 does not fit tightly about the interior peripheral edge of the steam chest 10, it is resiliently and forcibly urged into the steam chest so that it engages the peripheral edge, in a generally tangential fashion, at four points. The facial shield is thereby retained therein without the need of additional fastener means, and, more importantly, the facial shield completely confines the area immediately above and defined by the steam well 60. The majority of the steam which is generated in the steam well 60 therefore flows through the perforated tray 14 and the pad 121 into the facial shield 120. Accordingly, very little of the steam escapes outside of the facial shield.

As indicated above, the permeable pad 121 (FIGS. 27-29) positioned within the facial shield 120 functions to diffuse the steam generated within the steam chest 10. It has been determined that a 45 pore per inch porosity polyurethane pad which is approximately ⅜ inch in thickness is advantageously used. This pore porosity, in combination with the density of the perforations in the support tray 14, combine to give a uniform steady distribution of steam which is satisfactory for use both as a facial sauna and as an inhaler. A 20 to 30 pore porosity admits steam too rapidly for tolerance longer than one or two minutes, whereas a 60 to 100 pore porosity reduces steam passage to an ineffective level.

The pad 121, as can be best seen in FIG. 27, also has an elliptical configuration generally corresponding to that of the facial shield 120 when the latter is positioned within the steam chest. At ambient temperature and conditions, the pad 121 should fit loosely within the facial shield 120, with a marginal gap of approximately ⅛ inch, depending upon the particular material used, about its peripheral edge and the facial shield. This marginal gap is of critical importance, for the pad, when exposed to the steam generated in the steam chest 10, expands. If the size of the pad 121 is made to correspond to that of the interior of the facial shield, the expansion will cause one of its edges to buckle, and when the user inhales, the edge of the pad will flop open like a valve. A charge of live steam, that is, steam which has not been diffused by the pad, may hit the face of the user and may cause injury to him. The marginal gap compensates for the expansion of the pad so that, when expanded, it will just fit snugly within the facial shield. Of course, the pad when expanded should not be smaller than the interior of the facial shield either, for the same results may occur.

A pad 121, such as the one described above, also functions as a wick for the addition of medicants or inhalants. The upward scrubbing action of the steam inhibits the draining of the medicant into the steam well. The electrodes therefore are not operating in a medicant-diluted bath which necessarily causes contamination by the depositing of medicant on the electrode faces.

The steam in passing through the pad 121 also has a scrubbing action on the medicants or other inhalants, so that they also are diffused to a greater degree and a greater concentration thereof is directed or carried upward by the steam, to the user. The benefits provided to the user, therefore, are far more substantial than in those cases where the medicant or inhalant is merely deposited in the liquid, as in the case of a steam generator such as a vaporizer or the like.

To use the steam chest 10 as a facial sauna, or as an inhaler, a cupful of water (approximately 6 ounces) is poured into the base 11, and the facial shield 120 and the pad 121 positioned atop the support tray 14, generally as illustrated in FIGS. 22 and 23. The power cord 75 is next plugged into an ordinary wall outlet. The electrodes will immediately begin to generate steam, and the latter is filtered through the pad 121, which functions to diffuse it, and is directed up through the facial shield. The user merely places his face into the facial shield, with the upper edges thereof engaged with his head so as to substantially confine the steam within the facial shield. The steam chest 10 will continue to generate steam for approximately 20 to 30 minutes, at which time the water therein will all have been evaporated. It will be appreciated that where time periods are set forth, variations will occur in accordance with the practices of the user. If the cover is opened more frequently or left open longer, the 6 ounce charge of water will be dissipated more readily. The converse, of course, occurs when openings are limited as to number and duration.

If it is desired to add medicants or other inhalants, these are dropped onto the pad 121 which functions as a wick to absorb them. The steam in passing through the pad will create a scrubbing action, to cause greater diffusion of the medicants or inhalant.

In FIGS. 30 and 31, the facial shield 120 is shown wrapped around or slideably engaged about the steam chest 10, so as to function as a protective carrying case for the steam chest and to serve to lock the latter closed. The facial shield is proportioned so that its front portion, that is, the narrowest portion thereof, fits squarely between the two pairs of supporting feet 28 on the base of the steam chest 10, to effectively lock the facial shield to the steam chest.

In FIG. 31, it can also be seen that the permeable pad 121 is advantageously stored within the steam chest 10, atop the rollers 100. When the pad is positioned in this fashion, and the cover 12 is closed and the steam chest locked closed with the facial shield 120, the rollers are forcibly urged into resilient engagement with the pad. The pad therefore resiliently supports and retains the rollers so as to prevent them from spilling about in the steam chest as the latter is being transported. Accordingly, the pad functions is a triple capacity: to diffuse the steam in the facial shield, to retain and to diffuse medicants or other inhalants used in the steam chest, and to protect the rollers from damage when the latter are stored and transported in the steam chest.

Although particular embodiments of the invention have been shown and described in full here, there is no intention to thereby limit the invention to the details of such embodiments. On the contrary, the intention is to cover all modifications, alternative embodiments, usages and equivalents of a steam chest as fall within the spirit and scope of the invention, specification and the appended claims.

I claim:

1. A steam chest comprising, in combination, a base having side walls and a bottom, a dam having walls extending upwardly from the base bottom in spaced relation to the base side walls defining a steam well interiorly of the area defined by the dam walls, and a condensing water reservoir defined exteriorly between the dam walls and base side walls, means defining a metering slot in open communication between the condensing water reservoir and steam well, a cover for the base having side walls and a top, a perforated roller tray covering the steam well, and steam generating means within the steam well energized to boil water in the steam well to provide steam which circulates throughout the steam chest.

2. The steam chest of claim 1, wherein said cover is hingedly affixed to said base along a rear wall by means of a hinge comprising a lug depending from the cover with transverse hinge pin receiving means, hinge pin channel means in the base in flanking relation to the cover lug, said channel terminating in hinge pin stops at both ends, one end having a chamfered adjacent face, and a flexible hinge pin proportioned for insertion into the channel along the chamfered face into the lug hinge pin receiving means which snaps in place after passing the chamfer in selective abutting relation with the hinge pin stops.

3. In the steam chest of claim 1, lifting wings extending in opposite directions from the cover top outward from the sides of the steam chest whereby the user can open the cover from either side thereby minimizing exposure of either hand to steam.

4. In the steam chest of claim 1, a steam well is proportioned to receive substantially ⅓ of the total water charge in the steam well and the condensing water reservoir.

5. The steam chest of claim 2, further including an opening stop for the cover integral with each hinge lug and depending therefrom to engage the body thus providing a gravity support in the open position.

6. The steam chest of claim 1, further including a facial shield positionable within said bottom atop said perforated roller tray to adapt said steam chest for use as a facial sauna, said facial shield being tubular and having a cross-section defining an area the extension of which substantially surrounds the steam well therein, whereby the steam generated within the steam well is generally confined within and diffuses upwardly through said facial shield.

7. The steam chest of claim 6, wherein said facial shield is formed from a single blank of sheet material which is curved and has its free ends affixed together to form a tubular shape.

8. The steam chest of claim 6, wherein said facial shield is formed of a flexible material and is proportioned to be positionably seated within said base atop said perforated roller tray and to slidably receive said steam chest within its interior, whereby said facial shield also functions to lock the steam chest closed and serve as a carrying case for the steam chest.

9. The steam chest of claim 8, further including a permeable pad adapted to seat within the interior of said facial shield atop said perforated roller tray for diffusing steam generated in the steam well therebeneath.

10. The steam chest of claim 9, wherein said permeable pad has dimensions such as to provide a compensating marginal gap about its peripheral edge and between said facial shield of a sufficient size to permit said pad to expand when exposed to the steam generated in said steam well to fit snugly therein without buckling.

11. The steam chest of claim 10, wherein said pad is of polyurethane.

12. The steam chest of claim 10, wherein said pad is of a 45 pore per inch porosity polyurethane material.

13. The steam chest of claim 6 wherein said facial shield is proportioned to seat within said roller tray to engage the sides thereof in generally tangential fashion.

14. The steam chest of claim 6 wherein said facial shield is formed of a flexible material and is proportioned to be resiliently and yieldably urged into said steam chest to engage the sides of said roller tray in a generally four-point tangential fashion.

15. In the steam chest of claim 1, anchor means molded into the base of the perforated tray, and cooperating locking means in the base for permanently securing the tray to the base without any exposed metal parts.

16. In the steam chest of claim 1, drain means to permit overflow of water at a level below the bottom of the perforated tray.

17. The steam chest of claim 1, wherein said steam generating means comprises a pair of U-shaped electrodes, each of which is formed of a length of flat ribbon-like conductive material which is reversely bent to form a pair of substantially parallel legs, said pair of legs of each of said electrodes extending horizontally in said stream well and being interdigital with one another with the flat faces thereof vertically disposed such that they form three vertical resistance heating channels therebetween to facilitate rapid steam generation of the water within said steam well.

18. The steam chest of claim 17, further including a power cord coupled to said electrodes and a source of power, a safety lock for said power cord comprising, in combination, a "V" shaped wall on said base having a cord opening at its apex, a "W" shaped wall on said base, said walls being porportioned and positioned with respect to said "V" shaped wall to define opposed reversely bent labyrinth like channels, port means in the base wall to receive said power cord at the apex of the "V" shaped wall, and a closure member secured atop the "V" shaped and "W" shaped walls to lockingly receive said power cord split wires.

19. The steam chest of claim 18, wherein said closure member has a plurality of lugs oriented thereon to further wedgingly engage said power cord split wires and secure the same in said labyrinth like channels.

20. In combniation, a plurality of hair rollers and a steam chest for heating and moistening said hair rollers, said steam chest comprising a base for receiving and retaining a fluid therein, electrical steam generating means within said base energized to boil said fluid in said base to provide steam, a perforated support tray atop said steam generating means for supporting said plurality of hair rollers, a hinged cover for said base for normally enclosing said plurality of hair rollers to heat and moisten the same by the steam generated within the thus enclosed steam chest, lifting wings on said cover extending in opposite directions outward from the sides of said steam chest whereby the user can pivotally open the cover from either side thereby minimizing exposure of either hand to steam, and relief vents at an edge of said cover for permitting sufficient steam to escape thereby avoiding pressuring the interior of said steam chest and reducing the possibility of the user being exposed to a steam build-up.

21. A steam chest which is adapted for use both to steam hair rollers for setting hair and as a facial sauna comprising, in combination: a base having side walls and a bottom; a steam well within said base; a perforated roller tray atop said steam well adapted to support a plurality of hair rollers for steaming them; a tubular facial shield positionably seatable within said base atop said tray for directing steam upwardly, said facial shield being formed of a flexible material and proportioned to be resiliently and forcibly urged into said steam chest to engage the sides of said roller tray in a generally tangential fashion at four points, and further being proportioned to snugly receive said steam chest therein to thereby form a protective carrying case for said steam chest.

22. A steam chest which is adapted for use both to steam hair rollers for setting hair and as a facial sauna comprising, in combination: a base having side walls and a bottom; a steam well within said base; a perforated tray atop said steam well adapted to support a plurality of hair rollers for steaming them; a tubular shield positionably seatable within said base atop said tray for directing steam upwardly; a permeable pad adapted to seat interiorly of said facial shield atop said perforated tray for diffusing the steam generated in said steam well; said permeable pad being proportioned to provide a compensating marginal gap about its peripheral edge and said facial shield of a sufficient size to permit said pad to expand when exposed to the steam generated in said steam well to fit snugly therein without buckling, a cover having side walls and a top for closing said base; and steam generating means within the steam well.

23. The steam chest of claim 22, in combination with a plurality of hair rollers capable of being stored in said chest when closed and wherein said permeable pad is proportioned to seat within said steam chest atop said rollers when said steam chest is closed to protectively and positionably retain and support said rollers against damage while said steam chest is being stored or transported.

24. A steam chest comprising, in combination, a base having side walls and a bottom, a dam having walls extending upwardly from the base bottom in spaced relation to the base side walls defining a steam well interiorly of the area defined by the dam walls, and a condensing water reservoir defined exteriorly between the dam walls and base side walls, means defining at least one metering slot in open communication between the condensing water reservoir and steam well, a cover for the base, a perforated roller tray covering the steam well, and electric steam generating means within the steam well energized to boil water in the steam well to provide steam which circulates throughout the steam chest.

25. The steam chest of claim 24, wherein said cover is hingedly affixed to said steam chest and has lifting wings extending in opposite directions outwardly from the sides thereof whereby the user can pivotally open the cover from either side thereby minimizing exposure of either hand to steam.

26. The steam chest of claim 25, further including relief vents in a position remote from said lifting wings for permitting sufficient steam to escape thereby avoiding pressuring the interior of said steam chest and reducing the possibility of the user being exposed to a steam build-up.

27. The steam chest of claim 24, in combination with a plurality of hair rollers capable of being seated atop said roller tray, wherein said steam which circulates throughout said steam chest heats and moistens said hair rollers.

References Cited

UNITED STATES PATENTS

| | | | |
|---|---|---|---|
| 443,580 | 12/1890 | Lyke | 128—368 |
| 1,242,209 | 10/1917 | LaMotte | 219—288 |
| 1,659,970 | 2/1928 | Chouinard | 21—119 |
| 1,975,082 | 10/1934 | Bucy | 21—119 |
| 2,000,628 | 5/1935 | White | 219—273 |
| 2,158,692 | 5/1939 | Duberstein et al. | 219—288 |
| 2,230,245 | 2/1941 | Hettinger | 219—275 X |
| 3,222,499 | 12/1965 | Conlin et al. | 219—293 |
| 3,347,618 | 10/1967 | McKeown | 219—284 X |
| 3,351,737 | 11/1967 | Katzman et al. | 219—275 X |
| 1,175,442 | 3/1916 | Hanks | 219—438 X |
| 1,930,038 | 10/1933 | Crowley et al. | 4—165 |
| 2,128,883 | 8/1938 | Burt | 339—107 |
| 2,158,698 | 5/1939 | Hettinger | 219—271 |

FOREIGN PATENTS

| | | |
|---|---|---|
| 1,244,250 | 9/1960 | France. |
| 270,050 | 4/1966 | Australia. |
| 706,979 | 3/1965 | Canada. |
| 216,548 | 1/1942 | Switzerland. |
| 911,502 | 3/1946 | France. |

ANTHONY BARTIS, Primary Examiner

U.S. Cl. X.R.

4—165; 21—95; 128—368; 132—33; 219—275, 289, 401, 474